United States Patent
Brabenac

(10) Patent No.: US 7,729,711 B2
(45) Date of Patent: Jun. 1, 2010

(54) REDUCING INTERFERENCE FROM CLOSELY PROXIMATE WIRELESS UNITS

(75) Inventor: Charles L. Brabenac, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1963 days.

(21) Appl. No.: 10/434,782

(22) Filed: May 9, 2003

(65) Prior Publication Data

US 2004/0224708 A1 Nov. 11, 2004

(51) Int. Cl.
*H04B 7/005* (2006.01)

(52) U.S. Cl. ............... 455/502; 455/512; 455/434; 455/452.2

(58) Field of Classification Search ........... 455/553.1, 455/552.1, 41.2, 455, 63.1, 517, 41, 411, 455/427, 12.1, 430, 13.4, 452.1, 450, 451, 455/502, 512; 370/338, 462, 94.1, 336, 344, 370/480, 334, 347, 478, 328; 234/451

See application file for complete search history.

(56) References Cited

U.S. PATENT DOCUMENTS

| | | | | |
|---|---|---|---|---|
| 5,220,564 A * | 6/1993 | Tuch et al. | 370/338 |
| 5,339,316 A * | 8/1994 | Diepstraten | 370/401 |
| 5,448,731 A * | 9/1995 | Wang et al. | 718/103 |
| 5,511,072 A * | 4/1996 | Delprat | 370/336 |
| 5,999,538 A * | 12/1999 | Haddock et al. | 370/446 |
| 6,256,496 B1 * | 7/2001 | Dintelmann et al. | 455/427 |
| 6,337,871 B1 * | 1/2002 | Ranta | 455/413 |
| 6,449,461 B1 * | 9/2002 | Otten | 455/63.1 |
| 6,560,230 B1 * | 5/2003 | Li et al. | 370/395.42 |
| 6,766,160 B1 * | 7/2004 | Lemilainen et al. | 455/411 |
| 6,798,743 B1 * | 9/2004 | Ma et al. | 370/235 |
| 6,967,967 B1 * | 11/2005 | Gaspar et al. | 370/445 |
| 7,050,452 B2 * | 5/2006 | Sugar et al. | 370/465 |
| 7,099,671 B2 * | 8/2006 | Liang | 455/450 |
| 7,551,603 B1 * | 6/2009 | Shaffer et al. | 370/352 |
| 2001/0010689 A1 * | 8/2001 | Awater et al. | 370/344 |
| 2001/0014088 A1 * | 8/2001 | Johnson et al. | 370/338 |
| 2001/0031620 A1 * | 10/2001 | Ichiyoshi | 455/3.02 |
| 2002/0122405 A1 * | 9/2002 | Liang | 370/344 |
| 2002/0132590 A1 * | 9/2002 | Marshall | 455/73 |
| 2002/0136184 A1 * | 9/2002 | Liang et al. | 370/338 |
| 2002/0173272 A1 * | 11/2002 | Liang et al. | 455/63 |
| 2003/0110281 A1 * | 6/2003 | Minnick et al. | 709/232 |
| 2003/0117984 A1 * | 6/2003 | Gavette | 370/338 |
| 2003/0161325 A1 * | 8/2003 | Kekki | 370/395.43 |
| 2003/0236908 A1 * | 12/2003 | Khang | 709/231 |
| 2004/0069852 A1 * | 4/2004 | Seppinen et al. | 235/451 |
| 2004/0183749 A1 * | 9/2004 | Vertegaal | 345/7 |
| 2004/0185857 A1 * | 9/2004 | Lee et al. | 455/445 |
| 2004/0196798 A1 * | 10/2004 | Abousleman | 370/316 |
| 2004/0203474 A1 * | 10/2004 | Miller et al. | 455/69 |
| 2004/0207513 A1 * | 10/2004 | Nageli | 340/7.21 |
| 2005/0192048 A1 * | 9/2005 | Bridgelall | 455/553.1 |
| 2006/0038878 A1 * | 2/2006 | Takashima et al. | 348/14.08 |

(Continued)

Primary Examiner—Tan Trinh
(74) Attorney, Agent, or Firm—Trop, Pruner & Hu, P.C.

(57) ABSTRACT

A wireless device may include two or more wireless interfaces capable of transmitting and/or receiving signals over separate wireless networks. To reduce the likelihood of interference, a processing unit may determine whether to permit a transmission under one wireless network when a reception under another wireless network is already in progress.

12 Claims, 2 Drawing Sheets

U.S. PATENT DOCUMENTS

2006/0053377 A1* 3/2006 Newell et al. ............... 715/744
2006/0205363 A1* 9/2006 Godfrey ..................... 455/83
2007/0121634 A1* 5/2007 Anderson ................... 370/392

* cited by examiner

REDUCING INTERFERENCE FROM CLOSELY PROXIMATE WIRELESS UNITS

BACKGROUND

This invention relates generally to devices which receive and transmit wireless signals.

A variety of devices may be involved in receiving and transmitting wireless signals. A variety of processor-based systems may communicate with one another in a wireless network over relatively short or longer range distances. In addition, devices such as cell phones that have been conventionally thought of as communication devices may also function as processor-based systems.

As a result, in a number of different instances, devices may be able to send and receive wireless signals from the same or closely proximate hardware operate under two or more different wireless protocols on the same processor-based system. In addition, devices may operate in two or more different wireless networks from the same processor-based system. Thus, each network or protocol may be generally unaware of communications in the other network or protocol.

As a result of the ability to send and receive signals at the same time from proximate devices, one device may fail to account for the other. One result may be interference between communications in the two different wireless devices.

Thus, there is a need for ways to control or reduce interference when proximate devices coupled to a common processor-based system, are able to transmit and receive wireless signals at the same time over different wireless networks.

DETAILED DESCRIPTION

Figure 1:
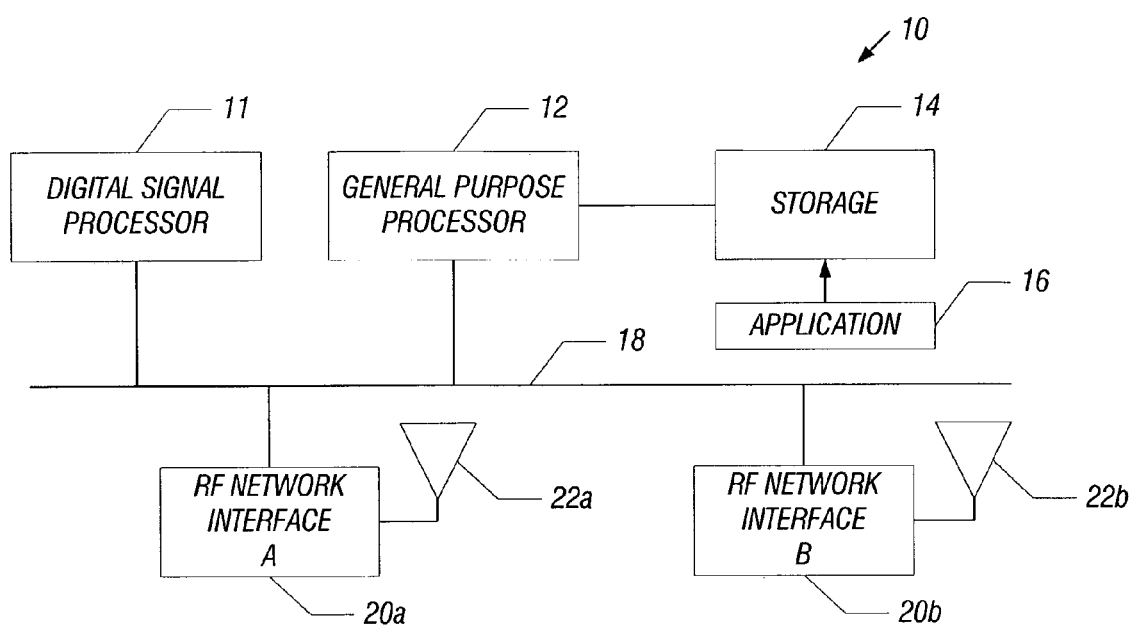
FIG. 1 is a hardware schematic view of one embodiment of the present invention.

Referring to FIG. 1, a wireless device 10 may be a processor-based system or a communication device. Examples of processor-based systems include desktop, laptop, and portable processor-based systems, commonly known as computers. Examples of wireless communication devices include cellular telephones, wireless network interfaces, and access points for wireless networks.

In some embodiments, the wireless device 10 may be controlled by a single processor that controls both the wireless transmission and the general processing tasks. In other cases, one processor may be utilized for wireless communications and another processor may handle the execution of any of a wide variety of software applications.

In the embodiment shown in FIG. 1, a separate digital signal processor 11 and general purpose processor 12 are illustrated. However, any type of controller may be used. The general purpose processor 12 may be responsible for executing various applications while the digital signal processor 11 may be responsible for handling wireless communications. In some cases additional processors may be provided. In other cases, one or more general purpose processors may be utilized. In some cases one or more digital signal processors may be utilized.

In one embodiment, the general purpose processor 12 may be coupled to a storage 14 that may store one or more applications, such as the application 16. The storage 14 may take a wide variety of forms. In battery powered applications, the storage 14 may be, for example, a flash memory. In other cases, the storage 14 may be a hard drive. In general, the storage 14 may be any semiconductor memory, any disk-based memory, or, in general, any device capable of storing an application program.

The processors 11 and 12 may be coupled by a bus 18 to a pair of network interfaces 20*a* and 20*b* in one embodiment. Each network interface 20*a* or 20*b* may be coupled to a different wireless network in one embodiment. Currently, a variety of wireless protocols are in widespread use. For example, cellular telephones may use a variety of wireless protocols including time division, code division, and analog protocols, to mention a few examples. Also, personal computers and other devices may communicate over short-range wireless protocols, such as the Bluetooth protocol (See Bluetooth Specification v. 1.1 (2003)) or ultra-wide band, also known as digital pulse wireless, as well as longer range wireless protocols, such as the IEEE 802.11 protocol (See IEEE 802.11, 1999 Edition (ISO IEC 8802-11; 1999). In addition, various wireless networks may be set up, such as personal area networks (PANs). These wireless networks may use the same or different wireless protocols, and they may be managed independently of one another.

For example, one wireless network may operate at 5 gigahertz according to an 802.11a protocol and another wireless network may operate at from 3.1 to 10.6 gigahertz at low power according to an ultra-wide band protocol. Thus, the operating frequencies of the two protocols overlap, making interference likely if a system attempts to transmit on one protocol and to simultaneously receive on the other protocol.

As a result, in one embodiment, for one or a variety of reasons, the wireless interfaces 20*a* and 20*b* may be coupled to the networks that are relatively independent of one another. The problem that arises is that one of the interfaces, such as the interface 20*a*, may attempt to transmit while the other interface 20*b* is attempting to receive. In many cases, the simultaneous proximate transmission and reception would result in interference absent coordination between the interfaces 20.

Within any given wireless network there may be protocols for reducing interference. These protocols may prohibit one wireless entity from transmitting while other wireless entities within the network, including the transmitting entity, are attempting to receive. However, where a single device 10 is capable of participating in disparate, uncoordinated, networks, such coordination may not be available because each network may operate independently of other networks.

Using the application 16, the general purpose processor 12 may control the wireless interfaces 20 to avoid at least in some cases, transmitting over one interface, such as the interface 20*a*, when the interface 20*b* is attempting to receive, in one embodiment. To this end, the processors 11 and 12 may communicate with one another.

The connection between the bus 18 and each interface 20*a* or 20*b* may be a wired or wireless connection. In addition, the interfaces 20*a* and 20*b* may be proximate or remote from the processors 11 and 12.

Each network interface 20*a* and 20*b* may include an antenna 22*a* or 22*b* that, in one embodiment of the present invention, may be a dipole antenna. In one embodiment, the antennas 22 may be responsible for both transmission and reception of signals. More or less antennas may be utilized in other embodiments of the present invention.

Figure 2:
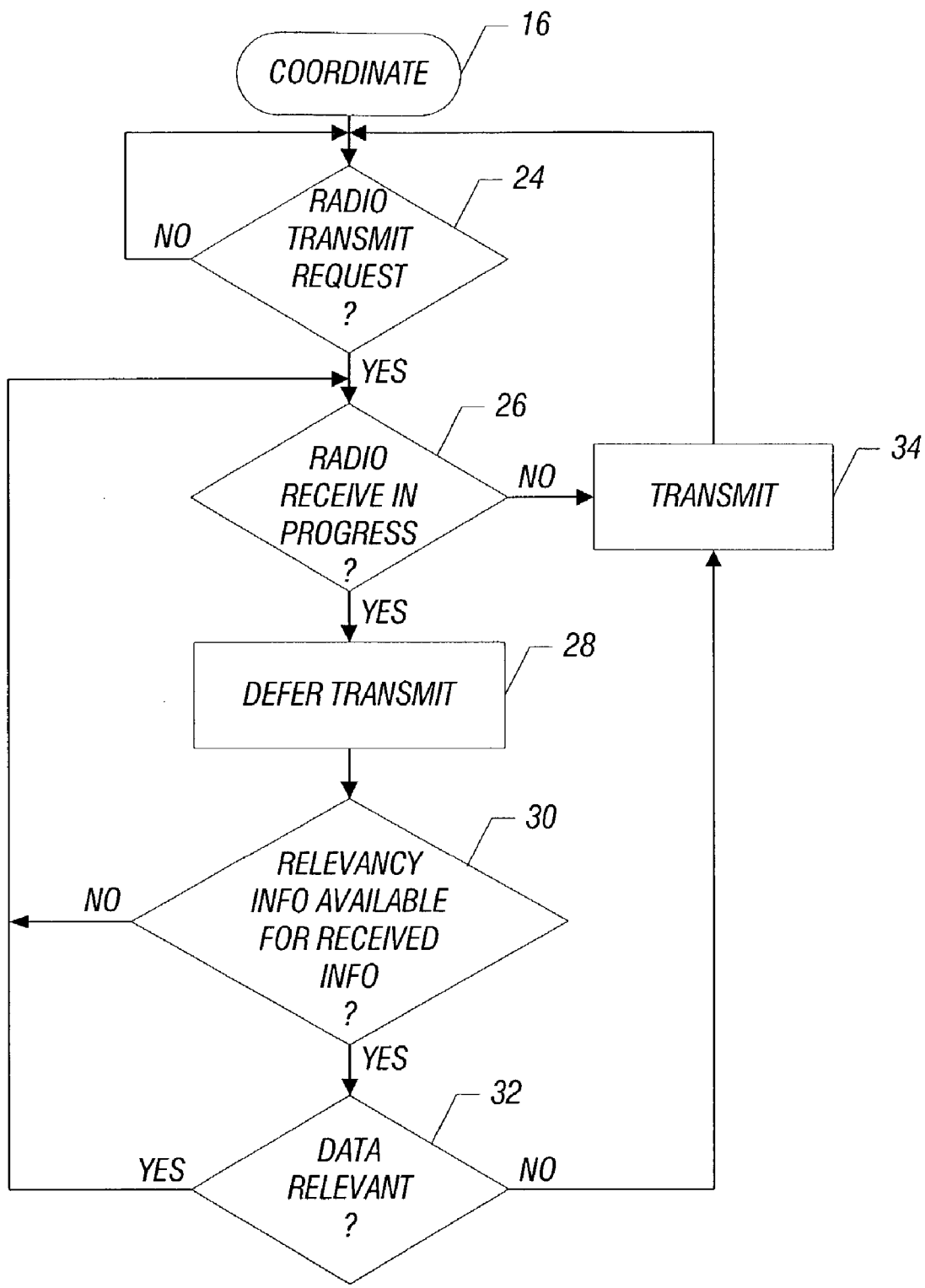
FIG. 2 is a flow chart for software in accordance with one embodiment of the present invention.

Referring to FIG. 2, in accordance with one embodiment of the present invention, the coordinating software 16 begins by determining whether there is a radio frequency transmit request from one of the interfaces 20 as determined at diamond 24. If so, a check at diamond 26 determines whether the other of the interfaces 20 is currently receiving a signal. If not, the interface 20 requesting permission to transmit is authorized to transmit as indicated in block 34. If another interface is currently receiving a signal, as determined in diamond 26, transmission may be deferred as indicated in block 28.

At diamond 30, the relevancy of the information being received is assessed. For example, if the information being received is of relatively low importance, and the transmission is of relatively high importance, the reception may be deferred for receipt upon retransmission at a later time. Generally, relevancy of information is determined by conventional packet filters.

If the relevancy of the received information is known, a check at diamond 32 determines how important or timely is the data being received. This determination, in one embodiment, may involve a comparison of the importance of the information being transmitted and the importance of the information being received. In addition, the time sensitivity of the information being received and transmitted may be weighed. If the data is considered relevant, meaning that the data is of sufficient timeliness or importance, the transmission may continue to be deferred. However, if the data is of relatively low relevance, the transmission may be allowed to proceed. In some cases relevancy may also be weighed by determining whether the data will automatically be available for reception at periodic intervals in the future.

Thus, in some embodiments of the present invention, communications over independent wireless networks may be controlled to reduce interference through the operation of the application 16 and a general purpose processor 12. In some embodiments, this allows a single wireless device to participate in more than one networks and/or to use more than one wireless protocol.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    receiving information about time criticality of a transmission on a first wireless network;
    receiving information about time criticality of a signal being received on a second wireless network; and
    selectively deferring a wireless transmission over a first wireless network to reduce interference with a received wireless signal over a second wireless network based on a determination of the time criticality of a signal to be transmitted relative to the time criticality of a signal to be received.

2. The method of claim 1 including selectively deferring a wireless transmission over a first wireless network to reduce interference with a received wireless signal over a second wireless network based on a determination of the relative importance of a signal to be transmitted and a signal to be received.

3. The method of claim 1 including selectively deferring transmission in response to the determination of whether the received wireless signal will be available for reception in the future.

4. The method of claim 1 including providing a pair of wireless interfaces, one for the first wireless network and the other for the second wireless network.

5. The method of claim 4 including wherein whether to defer transmission including determining whether a signal is currently being received over the second wireless network before transmitting a signal over the first wireless network.

6. An article comprising a medium storing instructions that, if executed, enable a processor-based system to:
    receive a request from a source to transmit information over a first wireless network;
    determine whether a signal is currently being received over a second wireless network; and
    determine whether to defer transmission to reduce interference between the reception and transmission of wireless signals based on a determination of the time criticality of a signal to be received that enable the processor-based system to determine the time criticality of a signal to be transmitted and a signal to be received.

7. The article of claim 6 further storing instructions that enable the processor-based system to determine the relative importance of the signal to be transmitted and the signal to be received.

8. The article of claim 6 further storing instructions that enable the processor-based system to determine whether a signal will be periodically available for reception in the future.

9. A system comprising:
    a processor;
    a first wireless interface for a first wireless network;
    a second wireless interface for a second wireless network;
    a dipole antenna coupled to a wireless interface; and
    a storage coupled to said processor storing instructions that, if executed, enable the processor to receive a request from a source to transmit information over the first wireless interface, determine whether a signal is currently being received over the second wireless interface, and selectively defer transmission to reduce interference between the reception and transmission of wireless signals based on a determination of whether the received wireless signal will be available for reception in the future.

10. The system of claim 9 wherein one of said interfaces operates on a first wireless protocol and the other of said interfaces operates on the second wireless protocol.

11. The system of claim 9 wherein said networks use at least one common frequency.

12. The system of claim 9 wherein one of said networks is an ultra-wide band network.

* * * * *